United States Patent [19]
Sugiyama

[11] Patent Number: 5,289,891
[45] Date of Patent: Mar. 1, 1994

[54] REAR-WHEEL STEERING APPARATUS FOR WHEELED VEHICLE

[75] Inventor: Mizuho Sugiyama, Toyota, Japan

[73] Assignee: Toyota Jidosha Kabushiki Kaisha, Toyota, Japan

[21] Appl. No.: 910,872

[22] Filed: Jul. 9, 1992

[30] Foreign Application Priority Data

Jul. 10, 1991 [JP] Japan .................. 3-195992

[51] Int. Cl.⁵ ............................................ B62D 5/04
[52] U.S. Cl. ................................... 180/79.1; 180/140; 280/91; 475/2; 475/5
[58] Field of Search ............... 180/79.1, 79.3, 140; 280/91; 475/1, 2, 5, 154, 282

[56] References Cited

U.S. PATENT DOCUMENTS

| | | | |
|---|---|---|---|
| 4,765,425 | 8/1988 | Saito et al. | 180/79.1 |
| 4,893,688 | 1/1990 | Morishita | 180/79.1 |
| 5,068,584 | 11/1991 | Herent et al. | 318/549 |
| 5,131,485 | 7/1992 | Io et al. | 180/79.1 |

FOREIGN PATENT DOCUMENTS

| | | |
|---|---|---|
| 0371851 | 6/1990 | European Pat. Off. |
| 0419925 | 4/1991 | European Pat. Off. |
| 1-186745 | 7/1989 | Japan |
| 212668 | 8/1989 | Japan |
| 301465 | 12/1989 | Japan |
| 3-153473 | 7/1991 | Japan |

OTHER PUBLICATIONS

Patent Abstracts of Japan of JP Appl. 1-291042, vol. 14, No. 91 (M-938) (4034) Feb. 1990.
Patent Abstracts of Japan of JP Appl. 63-6383, vol. 15, No. 381 (M-1162) Sep. 1991.

*Primary Examiner*—David M. Mitchell
*Assistant Examiner*—Andrew C. Pike
*Attorney, Agent, or Firm*—Cushman, Darby & Cushman

[57] ABSTRACT

A rear-wheel steering apparatus for a wheeled vehicle has a linkage mechanism for steering a set of dirigible rear road wheels. The steering apparatus includes a planetary gear unit, the carrier of which is adapted as an output element drivingly connected to an input member of the linkage mechanism, a first electric motor, the output shaft of which is drivingly connected to a sun gear of the planetary gear unit, a first electromagnetic brake mechanism arranged to be activated only when the vehicle is travelling at a higher speed than a predetermined speed for restricting rotation of the sun gear, a second electric motor, the output shaft of which is drivingly connected to a ring gear of the planetary gear unit, and a second electromagnetic brake mechanism arranged to be activated only when the vehicle is travelling at a lower speed than the predetermined speed for restricting rotation of the ring gear.

5 Claims, 2 Drawing Sheets

REAR-WHEEL STEERING APPARATUS FOR WHEELED VEHICLE

BACKGROUND OF THE INVENTION

1. Field of the Invention

The present invention relates to a rear-wheel steering apparatus in a four-wheel steering system of wheeled vehicles, and more particularly to a rear-wheel steering apparatus of the type which includes an electric motor drivingly connected through a speed reduction gear train to an input member of a linkage mechanism for steering a set of dirigible rear road wheels and arranged to be activated under control of an electric control device for controlling a turn-angle of the rear road wheels.

2. Description of the Prior Art

Disclosed in Japanese Patent Laid-open Publication No. 1-301465 is a rear-wheel steering apparatus of this kind which includes a single electric motor arranged to drive a linkage mechanism for steering a set of dirigible rear-road wheels. In the rear-wheel steering apparatus, it is required that the single electric motor has a high performance capable of steering the rear road wheels under a heavy load in stationary steering operation and steering the same at a high speed during high speed travel of the vehicle. To provide such a high performance, the electric motor becomes large in size, and a large electric current is required for control of the electric motor. It is, therefore, required to provide an electric control device for control of the large electric current, resulting in increase of the manufacturing cost.

SUMMARY OF THE INVENTION

A primary object of the present invention is to provide a rear-wheel steering apparatus in which the linkage mechanism can be operated by a small size electric motor to facilitate mounting of the steering apparatus on the vehicle body structure and can be controlled by a small electric current.

According to the present invention, the object is attained by providing a rear-wheel steering apparatus for a wheeled vehicle having a linkage mechanism for effecting steerage of a set of dirigible rear road wheels, which steering apparatus comprises a planetary gear unit the carrier of which is adapted as an output element drivingly connected to an input member of the linkage mechanism, a first electric motor the output shaft of which is drivingly connected to a sun gear of the planetary gear unit, a first electrically operated brake mechanism arranged to be activated only when the vehicle is travelling at a higher speed than a predetermined speed for restricting rotation of the sun gear, a second electric motor the output shaft of which is drivingly connected to a ring gear of the planetary gear unit, and a second electrically operated brake mechanism arranged to be activated only when the vehicle is travelling at a lower speed than the predetermined speed for restricting rotation of the ring gear.

BRIEF DESCRIPTION OF THE DRAWINGS

Additinal objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
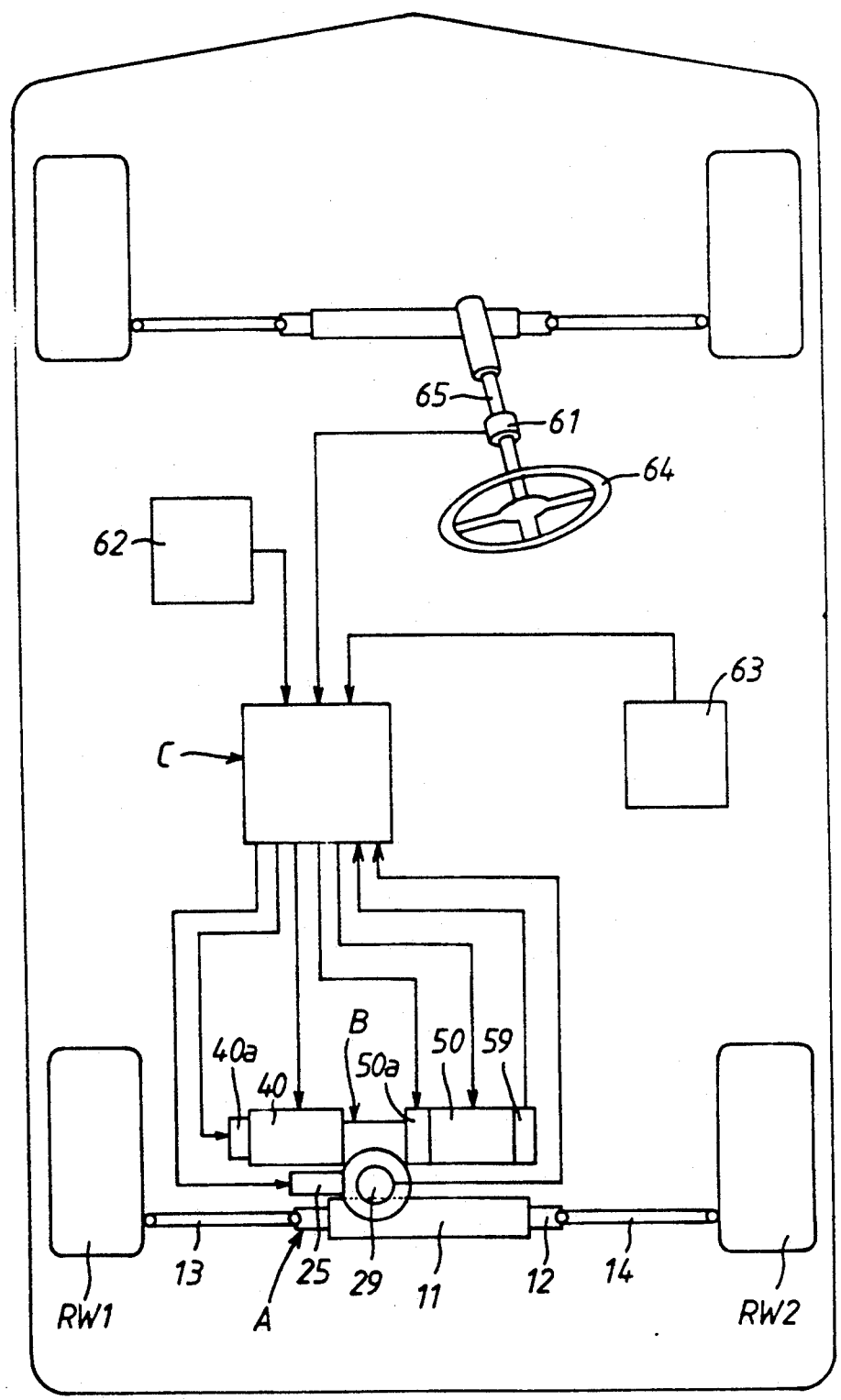
FIG. 1 is a schematic plan view of a four-wheel steering system for an automotive vehicle.

In FIG. 1 of the drawings, there is illustrated a four-wheel steering system equipped with a rear-wheel steering apparatus according to the present invention. The rear-wheel steering apparatus includes a linkage mechanism A arranged to steer a set of dirigible rear road wheels RW1, RW2, an actuator B for driving the linkage mechanism A, and an electric control device C for controlling operation of the actuator B. The linkage mechanism A comprises a rack bar 12 laterally movable in a housing 11 mounted on a vehicle body structure (not shown) and a pair of knuckle arms (not shown) operatively connected to the opposite ends of rack bar 12 through a pair of tie rods 13 and 14. In operation, the rear road wheels RW1, RW2 are steered in accordance with axial displacement of the rack bar 12.

Figure 2:
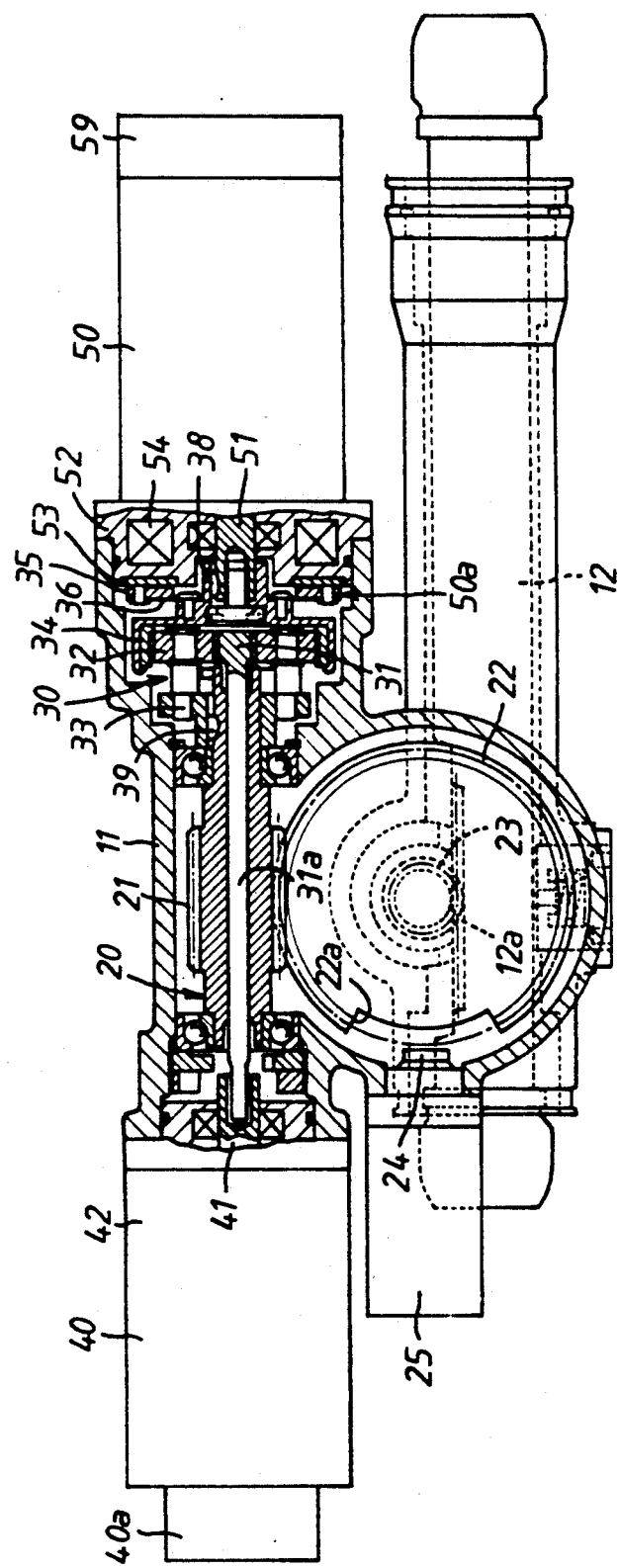
FIG. 2 is a partly broken sectional view of a rear-wheel steering apparatus in accordance with the present invention.

As shown in FIGS. 1 and 2, the actuator B is composed of an worm-wheel mechanism 20, a planetary gear unit 30, a first electric motor 40 and a second electric motor 50. The worm-wheel mechanism 20 includes a hollow worm shaft 21 rotatably mounted within the housing 11 and a toothed wheel 22 rotatably mounted within the housing 11 and meshed with a worm portion of shaft 21. The wheel 22 is coaxially formed with a pinion 23 in meshing engagement with a toothed portion 12a of rack bar 12. Assembled within the worm-wheel mechanism 20 is a steering angle limiter for restricting a maximum steering amount of rear road wheels RW1, RW2 in a predetermined amount. The steering angle limiter has a plunger 24 axially slidably mounted within the housing 11 to be moved toward and away from a recess 22a formed in the outer peripheral portion of wheel 22. The plunger 24 is loaded toward the outer periphery of wheel 22 by means of a spring (not shown) to be positioned in the recess 22a when the vehicle is travelling at a higher speed than a predetermined speed. When the vehicle speed becomes lower than the predetermined speed, the plunger 24 is retracted from the recess 22a by means of a solenoid 25 which is energized under control of the electric control device C. As shown in FIG. 1, a steering angle sensor 29 is assembled with the worm-wheel mechanism 20 to detect a rotation amount of wheel 22 for producing an electric signal indicative of a turn-angle of the rear road wheels and applying it to the control device C.

The planetary gear unit 30 includes a sun gear 31 integrally provided on one end of an input shaft 31a extending through the hollow worm shaft 21, a plurality of planetary gears 32 meshed with the sun gear 31, a carrier 33 fixedly mounted on one end of the worm shaft 21 through a key 39 for rotatably supporting thereon the planetary gears 32, and a ring gear 34 arranged in surrounding relationship with the planetary gears 32 and meshed therewith. The sun gear 31 is drivingly connected to an output shaft 41 of the first electric motor 40 through the input shaft 31a, while the ring gear 34 is drivingly connected to an output shaft 51 of the second electric motor 50 by means of a key 38. The ring gear 34 is provided with a movable disc 35 secured thereto through a spring disc 36. The movable disc 35 is associated with a stationary disc 53 and a solenoid 54 mounted on a housing 52 of the second electric motor 50 to provide an electromagnetic brake mechanism 50a. The electromagnetic brake mechanism 50a is operated under control of the electric control device C in such a manner that during travel of the vehicle at a higher speed than the predetermined speed the solenoid 54 is maintained in a deenergized condition to permit rotation of the ring gear 34 and that during travel of the vehicle at a lower speed than the predetermined speed the solenoid 54 is energized to restrict the rotation of ring gear 34 so that the ring gear acts as a reaction element of the planetary gear unit 30.

The first electric motor 40 is controlled by the electric control device C to be activated only when the vehicle is travelling at a lower speed than the predetermined speed and to be maintained in a deactivated condition during travel of the vehicle at a higher speed than the predetermined speed. Assembled with the first electric motor 40 is an electromagnetic brake mechanism 40a the operation of which is controlled by the electric control device C in such a manner that during travel of vehicle at a lower speed than the predetermined speed it is maintained inoperative to permit rotation of the sun gear 31 and that during travel of the vehicle at a higher speed than the predetermined speed it is operated to restrict the rotation of sum gear 31 so that the sun gear 31 acts as a reaction element of the planetary gear unit 30. The electromagnetic brake mechanism 40a is composed of a movable disc (not shown) fixed to the output shaft 41, a stationary disc (not shown) axially slidably mounted within a housing 42 of motor 40, a spring (not shown) arranged to bias the stationary disc toward the movable disc for engagement therewith, and a solenoid (not shown) assembled within the housing 42 to disengage the stationary disc from the movable disc against load of the spring when it has been energized.

The second electric motor 50 is controlled by the electric control device C to be activated only when the vehicle is travelling at a higher speed than the predetermined speed and to be maintained in a deactivated condition during travel of the vehicle at a lower speed than the predetermined speed. The second electric motor 50 is provided with a steering angle sensor 59 which is arranged to detect a rotation amount of the output shaft 51 during high speed travel of the vehicle for producing an electric signal indicative of a turn-angle of the rear road wheels and applying it to the control device C.

As shown in FIG. 1, the electric control device C is in the form of a microcomputer programmed to control each operation of the first and second electric motors 40, 50, electromagnetic brake mechanisms 40a, 50a and the solenoid 25 of steering angle limiter in response to input signals from a front-wheel steering angle sensor 61, a vehicle speed sensor 62 and a yaw-rate sensor 63 and from the rear-wheel steering angle sensors 29, 59. The front-wheel steering angle sensor 61 is arranged to detect a rotation angle of a steering shaft 65 for producing an electric signal indicative a turn-angle of dirigible front road wheels. The reference numeral 64 designates a steering wheel mounted on the steering shaft 65.

Assuming that the carrier 33 of planetary gear unit 30 is applied with a heavy load during travel of the vehicle at a lower speed than the predetermined speed, the second electric motor 50 is maintained in a deactivated condition, and the brake mechanism 50a is operated so that the ring gear 34 acts as a reaction element of the planetary gear unit 30. On the other hand, the brake mechanism 40a is conditioned inoperative to permit rotation of the sun gear 31, and the first electric motor 40 is activated in response to a control signal from the control device C to drive the sun gear 31. In this instance, the sun gear 31 acts as an input element of the planetary gear unit 30 while the carrier 33 acts as an output element of the planetary gear unit 30. Thus, the planetary gear unit 30 acts as a speed reduction gear train to produce a large output torque therefrom at a large reduction ratio. The output torque from planetary gear unit 30 is transmitted to the rack bar 12 through the worm-wheel mechanism 20 to steer the rear road wheels RW1, RW2 the turn-angle of which is controlled in accordance with input signals from the front-wheel steering angle sensor 61, vehicle speed sensor 62 and yaw-rate sensor 63 and from the rear-wheel steering angle sensor 29.

When the carrier 33 of planetary gear unit 30 is applied with a light load during travel of the vehicle at a higher speed than the predetermined speed, the first electric motor 40 is maintained in a deactivated condition, and the brake mechanism 40a is operated so that the sun gear 31 acts as a reaction element of planetary gear unit 30. On the other hand, the brake mechanism 50a is conditioned inoperative, and the second electric motor 50 is activated in response to a control signal from the control device C to drive the ring gear 34. In this instance, the ring gear 34 acts as an input element of the planetary gear unit 30 while the carrier 33 acts as an output element of the planetary gear unit 30. Thus, the planetary gear unit 30 acts as a speed reduction gear train to produce a small output torque therefrom at a small reduction gear ratio. The output torque from planetary gear unit 30 is transmitted to the rack bar 12 through the worm-wheel mechanism 20 so that the rear road wheels RW1, RW2 are steered in accordance with input signals from the front-wheel steering angle sensor 61, vehicle speed sensor 62 and yaw-rate sensor 63 and from the rear-wheel steering angle sensor 59. In this instance, the rear-wheel steering angle sensor 59 detects the turn-angle of the rear road wheels prior to operation of the second electric motor 50. This is effective to conduct fine control of the turn-angle of the rear road wheels.

As is understood from the above description, the rear road wheels can be steered by small output of the respective electric motors during travel of the vehicle at any speed. Accordingly, a small size electric motor can be adapted as the respective electric motors 40, 50 to facilitate mounting of the rear-wheel steering apparatus on the vehicle body structure, and the electric control device C can be manufactured at a low cost since the electric motors 40, 50 can be controlled by a small current.

In the above embodiment, the rear-wheel steering apparatus is equipped with the two electric motors 40, 50 which are respectively associated with the electromagnetic brake mechanisms 40a, 50a. If either one of electric motors 40 or 50 was out of order, the other electric motor and its associated brake mechanism would be operated to return the rear road wheels RW1, RW2 to their straight positions so as to ensure the steering stability of the vehicle. The rear-wheel steering apparatus is also equipped with the steering angle limiter which acts to restrict the maximum steering amount of the rear road wheels RW1, RW2 in the predetermined amount during travel of the vehicle at a higher speed than the predetermined speed. The steering angle limiter is useful to ensure the steering stability of the vehicle even if the electric motors 40, 50 or the control device C becomes out of order.

What is claimed is:

1. A rear-wheel steering apparatus for a wheeled vehicle having a linkage mechanism for effecting steerage of a set of dirigible rear road wheels, comprising:

a planetary gear unit the carrier of which is adapted as an output element drivingly connected to an input member of said linkage mechanism;

a first electric motor the output shaft of which is drivingly connected to a sun gear of said planetary gear unit;

a first electrically operated brake mechanism connected to and operatively engaging said sun gear for restricting rotation of said sun gear only when the vehicle is travelling at a higher speed than a predetermined speed;

a second electric motor the output shaft of which is drivingly connected a ring gear of said planetary gear unit; and a second electrically operated brake mechanism connected to and operatively engaging said ring gear for restricting rotation of said ring gear only when the vehicle is travelling at a lower speed than the predetermined speed.

2. A rear-wheel steering apparatus as recited in claim 1, wherein said linkage mechanism comprises a rack bar operatively connected at its opposite ends to said rear road wheels, a toothed wheel coaxially provided with a pinion in meshing engagement with a toothed portion of said rack bar and a worm shaft meshed with said toothed wheel at its worm portion, and wherein said planetary gear unit is mounted on one end of said worm shaft.

3. A rear-wheel steering apparatus as recited in claim 2, further comprising a steering angle limiter associated with said toothed wheel to restrict a maximum steering amount of said rear road wheels in a predetermined amount.

4. A rear-wheel steering apparatus as recited in claim 3, wherein said steering angle limiter comprises a plunger arranged to be moved toward and away from a recess formed on the outer periphery of said toothed wheel.

5. A rear-wheel steering apparatus as recited in claim 2, wherein said first and second electric motors are arranged at opposite ends of said worm shaft coaxially therewith, and wherein said sun gear of the planetary gear unit is mounted on one end of an input shaft extending through said worm shaft and having the other end drivingly connected to the output shaft 41 of said first electric motor, said carrier of said planetary gear unit is mounted on one end of said worm shaft, and said ring gear of said planetary gear unit is arranged in surrounding relationship with a plurality of planetary gears carried by said carrier and is drivingly connected to the output shaft of said second electric motor.

* * * * *